J. Reilly,
Axle Box.
No. 62068.    Patented Feb 12. 1867.
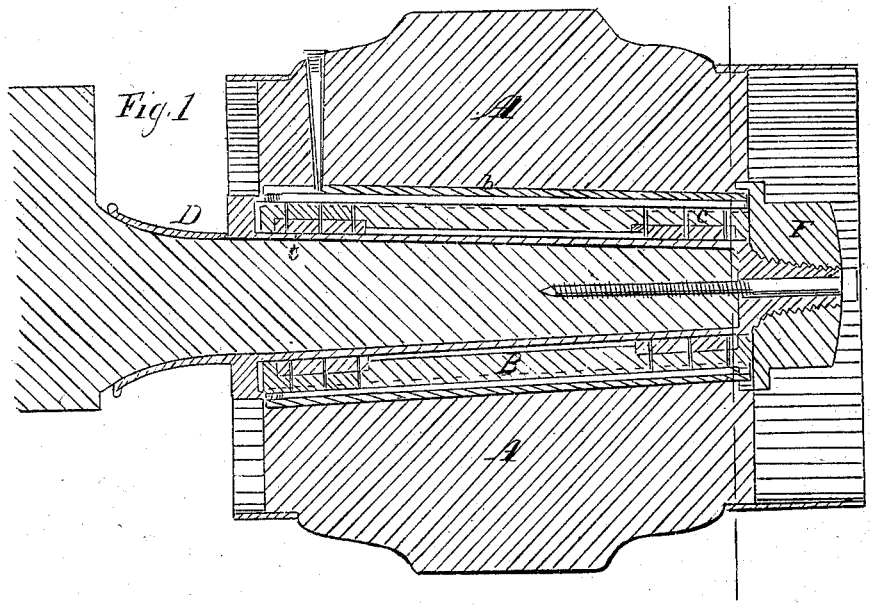
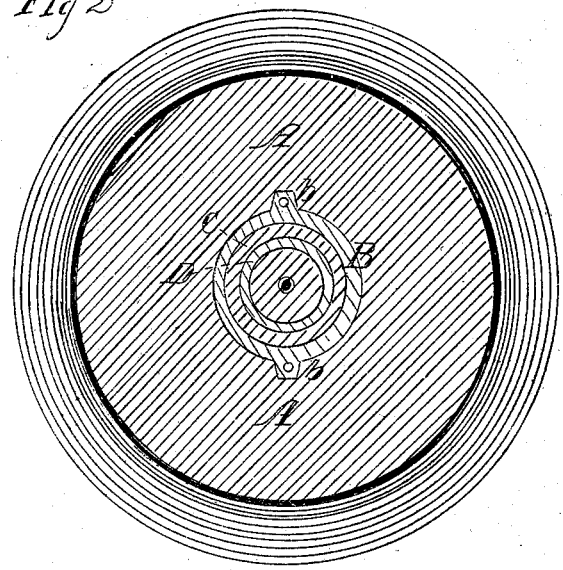
Witnesses
Wm. D. Baldwin
Thos. Falvey
John Reilly

United States Patent Office.

JOHN REILLY, OF RACINE, WISCONSIN, ASSIGNOR TO HIMSELF AND THOMAS FALVEY.

Letters Patent No. 62,068, dated February 12, 1867.

IMPROVEMENT IN AXLE-BOX FOR VEHICLES.

*The Schedule referred to in these Letters Patent and making part of the same.*

TO ALL WHOM IT MAY CONCERN:

Be it known that I, JOHN REILLY, of the city and county of Racine, in the State of Wisconsin, have invented a new and useful Improvement in Axle-Boxes for Vehicles, of which the following is a full, clear, and exact description, reference being had to the accompanying drawings, which make part of this specification, and in which—

Figure 1 is a longitudinal central section through my improved axle-box; and

Figure 2 a transverse section through the same, at the line $x$ $x$ of fig. 1.

The improvement herein claimed consists in a novel method of inserting rings of brass, steel, or other metal, inside the box to diminish friction and lessen the wear of the box. My improvement further consists in combining with the box longitudinal hollow ribs, which serve to prevent the box from turning in the hub, and as channels for lubricating the axle. My invention further consists in so arranging the oil chambers as to keep the oil away from the axle until required for use.

In the accompanying drawings, a hub, A, of ordinary construction, is shown as having my improved axle-box B inserted into it. The skein D is cast with a flange, $d$, at its inner end. The box and hub are slipped over the axle, and held in place by a nut, F, and screw in the usual way. In forming my boxes, I prefer to set the metal rings C in the mould, and then to cast the box around them. Forming any irregularities in the surface of the rings will keep them from turning in the box. It will be seen that the ends of the rings are overlapped by the cast metal; this prevents the displacement of the rings from the end-thrust of the axle on the lining rings in jarring over rough roads. I cast upon the periphery of the box one or more hollow ribs $b$. These ribs, when the box is driven into the hub, prevent it from turning, and also form ducts for conveying oil to the axle. The oil is poured into these ducts through a cavity, E, in the axle, and flows through holes $e$ in the box to the axle. The ducts may be filled with cotton-waste, or other absorbent material, and form reservoirs or chambers to hold the oil. The advantage of this arrangement is that the oil in the ducts is kept out of contact with the axle until required for use, and thus kept clean and limpid. I have described the ribs or oil chambers $b$ as cast with or on the box; but it is obvious that they might be made of either cast or wrought metal, separately, and afterwards fastened to the box, or they might even be made of cast or wrought metal and be put into the mould, and have the box cast upon them.

What I claim as my invention, and desire to secure by Letters Patent, is—

Casting the box around the rings, as and for the purpose described.

I also claim the arrangement, as described, of the rings within the boxes, so that the box shall overlap the rings to prevent the displacement of the rings from end-thrust of the axle on the boxes.

I also claim the combination, substantially as described, with an axle-box, of hollow longitudinal ribs, which serve both to fasten the box in the hub and to convey oil to the axle, whether said ribs or chamber be cast with the box, or made separately of cast or wrought metal and afterwards attached to the box.

I also claim the arrangement of the oil reservoirs, the axle, and the lining rings, as and for the purpose set forth.

In testimony whereof I have hereunto subscribed my name.

JOHN REILLY.

Witnesses:
WM. D. BALDWIN,
THOS. FALVEY.